Figure 1:
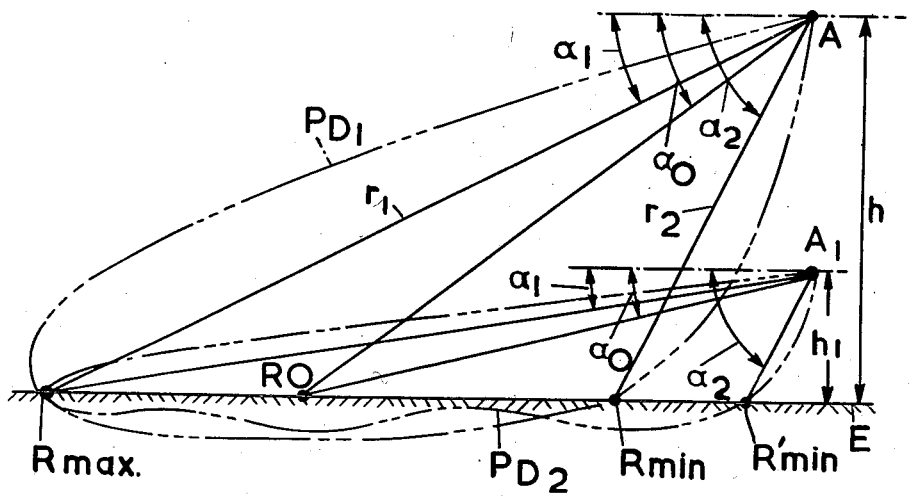

Jan. 1, 1952     C. H. SMITH ET AL     2,580,965
AERIAL SYSTEM
Filed July 31, 1947

C. H. SMITH
H. G. BOOKER
P. M. WOODWARD
Inventors

By Nelson Moore
Attorney

Patented Jan. 1, 1952

2,580,965

UNITED STATES PATENT OFFICE 2,580,965

AERIAL SYSTEM

Charles Holt Smith, Great Malvern, Henry G. Booker, Cambridge, and Philip Mayne Woodward, Great Malvern, England Application July 31, 1947, Serial No. 765,208
In Great Britain September 18, 1945

Section 1, Public Law 690, August 8, 1946
Patent expires September 18, 1965

9 Claims. (Cl. 250—33.65)

This invention relates to aerial systems for use in echo detection systems in which an exploring beam of energy, preferably of pulse modulated form is transmitted and the reflected echo signals received in response thereto from a distant object are used to operate suitable means by which useful information regarding, for instance, the range and/or bearing of the object may be obtained. Although not limited thereto, the invention is particularly applicable to radio location apparatus of the above kind for use in aircraft for the purpose of detecting the presence and/or position of objects such as towns, coast lines, shipping and the like located on the earth's surface.

In apparatus of the above kind it is frequently necessary to provide means by which objects located in or substantially in a common plane may be detected from a point which is not in that plane but which is at some chosen distance above or below it. With such an arrangement it is furthermore required that objects shall be capable of detection not only at the longest possible range, but also at all intermediate ranges up to an irreducible minimum which is usually set by the particular distance of the detecting apparatus above or below the plane containing the objects to be detected. For example, in an arrangement for detecting towns and the like located on the (assumed) plane of the earth's surface from an aircraft flying at a height of, say, 10,000 feet, the irreducible minimum range would be approximately two miles; i. e. rather greater than the distance between the aircraft and the town or like object when the former is located immediately above the latter.

In order to facilitate description the aforesaid plane containing the objects which require to be detected will be referred to as the "location plane" while the position at which the echo detection apparatus is situated either above or below such plane will be referred to as the "locating point."

The object of the present invention is to provide an improved aerial system for use in echo detection apparatus required to operate under conditions as above described and providing continued uninterrupted detection of reflecting objects at all ranges between the required maximum and minimum values.

According to the present invention there is provided in an echo detection system in which an exploring beam of energy is transmitted from a locating point (as herein defined) to detect objects in a location plane (as herein defined) an aerial system adapted to transmit energy to and/or receive energy from objects in said location plane comprising a reflecting mirror surface so constructed that its radiation/reception characteristic in a plane at right angles to said location plane has power intensity values substantially proportional to the square of the cosecant of the angle between the location plane and the direction of an object in the location plane from the location point within the limiting angles defined by the direction of an object in said location plane at the maximum required range and the direction of an object in the location plane at the minimum required range.

While in most circumstances it would be desirable for an object at the maximum required range and an object at the minimum required range to mark the complete cut-off limits of the polar diagram, this is not normally possible. It is advisable however to make the power intensity at points lying outside this range as small as possible.

The reflecting mirror surface may take the form of a part-paraboloid divided diametrically in a horizontal plane, the upper half being displaced backwardly away from the focal point of said paraboloid by a distance substantially equal to ⅛ of the wavelength of the energy required to be transmitted and/or received by the aerial system whereby the required radiation/reception characteristic is obtained.

Figure 2:
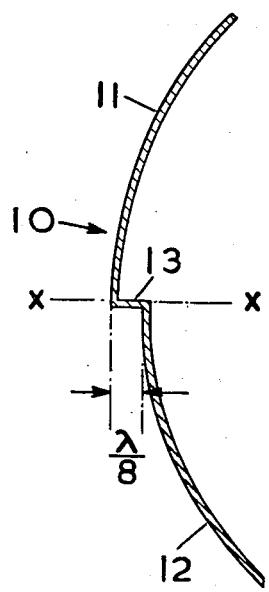

This and other objects will be readily seen from the following description and accompanying drawings in which:

Figure 1 is a diagram illustrating various of the radiation/reception considerations, and Figure 2 is a vertical sectional view of one embodiment of my invention.

Referring to Figure 1, A represents the locating point, e. g. an aircraft at a chosen height $h$ above the surface of the earth E. The latter, which constitutes the location plane, is assumed for simplicity to be a plane and horizontal surface since, under most practical conditions of application, the curvature actually present introduces errors of negligible size.

Point R max at slant range $r_1$ from the locating point A represents the most distant position on the earth's surface which is required to be detected by radio location apparatus within the aircraft. This point R max lies at angle $\alpha_1$ below the horizontal plane through point A. A similar point R min at slant range $r_2$ from the aircraft A represents the nearest position on the earth's surface which is to be detected by the radio location apparatus. This point R min lies at an angle $\alpha_2$ below the horizontal plane through point A. It will be appreciated that the absolute minimum range possible, i. e. that equal to the height $h$ when $a$ is equal to 90°, is normally not usable.

It is required that the apparatus in the aircraft at point A shall be capable of detecting objects at any position along the earth's surface between R max and point R min.

As will be apparent from consideration of Figure 1 the provision of a suitable radiation/reception characteristic or polar diagram for the aerial system or systems employed at the aircraft at point A for transmitting and receiving the exploring wave and echo signals respectively is not a simple matter. If, for example, the vertical polar diagram selected for, say, transmission of the exploring wave, is one beamed at the angle $a$ 1 towards a more distant object such as R max then objects at shorter range such as any between points $R_0$ and R min will be insufficiently "illuminated" to give proper response. Similarly if the polar diagram is one beamed towards R min then the objects at a longer range will pass undetected.

A compromise in the form of a generally broad beam whose maximum direction lies at a mid angle such as that of $a_0$ is also unsatisfactory for the reason that the illumination of a given object at say $R_0$ will be much more intense than the illumination of a similar object at, say, R min or R max. As with many forms of radar equipment the relative response obtained from different objects plays an important part in their identification, the wide variation of illumination intensity provided by such an arrangement is quite unsatisfactory.

The above difficulties are overcome when, according to the invention, the polar diagram of the aerial system employed at a point such as A is one in which over the required angle $a$ 1 to $a$ 2, the power intensities in the various directions in the vertical plane between the two limits are related to one another by ratios which corresponds to the squares of the cosecant values of the related angles of such directions below the horizontal plane through A. For example, the power intensity in the direction of angle $a$ 1 towards the point R max would have a value of $K \operatorname{cosec}^2 a$ 1 whereas the power intensity in, say, a direction towards point $R_0$ would be equal to $K \operatorname{cosec}^2 a_0$ and the power intensity in direction towards R min would be equal to $K \operatorname{cosec}^2 a$ 2 where K is a suitable constant.

Precisely the same conditions hold when the point A, is at a much lower level as shown at $A_1$. If the same maximum range to reach the point R max is required then the power intensity in that direction is correspondingly increased by reason of the increase in the relevant $\operatorname{cosec}^2 a$ factor. In this instance the minimum range possible is considerably less e. g. as shown at $R^1$ min, due to the decreased height $h_1$ of the aircraft since under most conditions the value of the angle $a$ 2 will remain substantially constant.

The ideal polar diagram according to the invention would be one conforming to the triangle A, R max, R min, but normally of course this is not attainable. By suitable directional aerial structures however it is possible to obtain a polar diagram such as that shown at $PD_1$ or at $PD_2$ in which, over the required or useful angle $a$ 1 to $a$ 2, the various power intensities conform substantially to the ideal.

Figure 2 shows one constructional embodiment of reflecting mirror by which the required power distribution may be obtained. In this construction, 10 indicates generally a part-paraboloid which is divided along the horizontal diametrical plane X—X. The upper half of such mirror is displaced horizontally away from the focal point by a distance equal to $\lambda/8$ of the operating wavelength. The upper mirror half 11 and the lower half 12 may be joined by a shelf 13 located in the division plane.

Such a mirror structure will be found to possess over part of its polar diagram a power intensity distribution which varies substantially in accordance with the $\operatorname{cosec}^2 a$ characteristic above described. The mirror structure 10 is accordingly displaced angularly in the vertical plane whereby the said region of the polar diagram having the substantially $\operatorname{cosec}^2 a$ characteristic coincides substantially with the required angular directions such as those of $a1$—$a2$ of Figure 1.

We claim:

1. An antenna system comprising an antenna element, a concave reflector facing said element, means for interchanging energy to said reflector on a predetermined sharply defined wavelength, said reflector having first and second curved metallic sheets the concave side of one of which extends behind the convex side of the other sheet, and a shelf of a depth substantially one-eighth of said wavelength intersecting said sheets and substantially perpendicular to them along the lines of the intersections.

2. An antenna for a plan position indicator comprising a concave reflector having an axis and including wave distorting means, means for feeding radio frequency energy of predetermined wavelength into said reflector, said wave distorting means including means to modify the radiation characteristic of said reflector in one plane containing the axis in such a manner that a radiation characteristic in a scanning plane perpendicular to a target plane is produced which has power intensity values substantially proportional to the square of the cosecant of the angle between the target plane and a line joining an object in the target plane with said reflector, said last named means comprising a discontinuity in the surface of said reflector extending in a direction substantially perpendicular to said scanning plane and produced by the displacement of one-half of said reflector away from the other half in a direction along said axis a distance of substantially one-eighth of the wavelength of said energy.

3. An antenna for a plan position indicator comprising a reflector, means for feeding radio frequency energy of predetermined wavelength into said reflector, wave distorting means comprising a discontinuity in the surface of said reflector, said reflector comprising a part-paraboloid having a focal point, said part-paraboloid being divided diametrically in a substantially horizontal plane, the upper half of said divided paraboloid being displaced from the focal point of said paraboloid by a distance substantially equal to one-eighth of the wavelength of said energy.

4. An antenna for a radio frequency detection and location apparatus comprising a reflector, means for feeding radio frequency energy of predetermined wavelength into said reflector, said reflector comprising two distinct reflecting surfaces one above the other, each of said reflecting surfaces being formed of a curved metallic sheet, shelf means fixing said reflecting surfaces in a predetermined positional relationship with respect to one another, one of said reflecting surfaces being a distance of substantially one-eighth the wavelength of said energy behind the other reflecting surface.

5. An antenna claimed in claim 4 in which said two reflecting surfaces are of substantially the same area.

6. An antenna as claimed in claim 4 in which said two reflecting surfaces are congruent.

7. An antenna as claimed in claim 6 in which said shelf means is in a substantially horizontal plane.

8. An antenna as claimed in claim 7 in which said two reflecting surfaces one above the other comprise an upper surface and a lower surface the upper of said reflecting surfaces being displaced to the rear of the lower of said reflecting surfaces.

9. An antenna as claimed in claim 8 in which each of said reflecting surfaces has a concave surface, each of said concave surfaces facing said means for feeding radio frequency energy.

CHARLES HOLT SMITH.
HENRY G. BOOKER.
PHILIP MAYNE WOODWARD.

REFERENCES CITED

The following references are of record in the file of this patent:

UNITED STATES PATENTS

| Number | Name | Date |
|---|---|---|
| 1,552,328 | Matthyssen et al. | Sept. 1, 1925 |
| 1,625,946 | Laird | Apr. 26, 1927 |
| 2,118,419 | Scharlau | May 24, 1938 |
| 2,203,807 | Wolff | June 11, 1940 |
| 2,213,012 | Matera | Aug. 27, 1940 |
| 2,287,533 | Peterson | June 23, 1942 |
| 2,454,805 | Kandoian | Nov. 30, 1948 |
| 2,489,865 | Cutler | Nov. 29, 1949 |

FOREIGN PATENTS

| Number | Country | Date |
|---|---|---|
| 409,469 | Germany | Feb. 4, 1925 |
| 586,650 | France | Jan. 8, 1925 |
| 436,355 | Great Britain | Oct. 9, 1935 |